United States Patent [19]

Hickox

[11] Patent Number: 5,824,384

[45] Date of Patent: Oct. 20, 1998

[54] HAIR PERMING MAT MATERIAL AND APPARATUS

[76] Inventor: John E. Hickox, 12230 SW. Breyman Ave., Portland, Oreg. 97219

[21] Appl. No.: 11,120

[22] Filed: Jan. 29, 1993

Related U.S. Application Data

[63] Continuation of Ser. No. 740,859, Jul. 31, 1991, abandoned, which is a continuation of Ser. No. 393,973, Aug. 14, 1989, abandoned.

[51] Int. Cl.⁶ .................. B32B 3/02; A45D 2/00
[52] U.S. Cl. .................. 428/61; 428/102; 428/114; 428/304.4; 132/222
[58] Field of Search .................. 428/61, 102, 114, 428/304.4; 132/222

[56] References Cited

U.S. PATENT DOCUMENTS

| | | | |
|---|---|---|---|
| 1,719,555 | 7/1929 | Lewis et al. | 132/222 |
| 2,162,081 | 6/1939 | Hall | 132/222 |
| 3,545,457 | 12/1970 | Schepis | 132/222 |
| 4,540,006 | 9/1985 | Collis | 132/246 |
| 4,648,414 | 3/1987 | Fox et al. | 132/246 |

FOREIGN PATENT DOCUMENTS

| | | | |
|---|---|---|---|
| 0391590 | 5/1933 | United Kingdom | 132/222 |
| 0701380 | 12/1953 | United Kingdom | 132/222 |
| 2194437 | 3/1988 | United Kingdom | 132/222 |

*Primary Examiner*—Terrel Morris
*Attorney, Agent, or Firm*—Chernoff, Vilhauer, McClung & Stenzel, LLP

[57] ABSTRACT

An improved perming mat for use with hair care solutions is disclosed. Interposed between adhered, absorbent, coextensive, layered expanses of hair-care-solution-inert and hypoallergenic materials are spaced, small gauge, malleable wire stiffeners, each covered with an inert and hypoallergenic material. The extended-life, shape-retentive layered structure is non-reactive with the corrosive agents found in hair care solutions, and is non-irritating of the scalp. In a proposed modification, the coverings of the wire stiffeners are visibly colored coded to provide use indicia.

12 Claims, 1 Drawing Sheet

HAIR PERMING MAT MATERIAL AND APPARATUS

This application is a continuation of application Ser. No. 07/740,859, filed Jul. 31, 1991, now abandoned, which is a continuation of application Ser. No. 07/393,973, filed Aug. 14, 1989, now abandoned.

BACKGROUND AND SUMMARY OF THE INVENTION

This invention relates generally to perming mats for use with hair care solutions. More specifically, it concerns an improved hair perming mat that exhibits extended life, is made of hypoallergenic materials and is inert in the presence of hair care solutions.

Known prior art perming mats generally are made by adhering an elongate layer of polyurethane foam to an aligned, elongate layer of paper or cloth fiber. A plurality of copper wires aligned in parallel with one another extends longitudinally between the adhered layers of material with the wires captured within the mat. The wires stiffen the perming mat, thereby enabling it to retain a desired shape. The perming mats may be used to retain the shape of hair captured therein while a hair care solution, e.g. a perming or neutralizing solution, is applied to the hair through one of the absorbent layers. Once the hair is set with the desired combination of wave, curl, spiral or zigzag, etc., the perming mat is removed.

Economic and environmental considerations dictate reuse of the perming mats. This typically requires washing the mats and flattening them to restore their original, generally planar shape. One of the many problems with conventional perming mats is that they have short life expectancy, e.g. a dozen such cycles, before breakage of the wire stiffeners or delamination of the opposed expanses occurs. This is believed to be because certain chemical agents in hair care solutions are corrosive of copper and other metals used in forming the wire stiffeners, and because the interface between such metals and such layers is incompatible with repeated flexion and unyielding adhesion. Another common problem is that mats having copper wires, as typically have been used heretofore, suffer serious discoloration as the corrosive reaction occurs, thus necessitating more frequent washings and imbuing the mats with a permanently soiled appearance. Yet another problem is that the layered, absorbent materials of which conventional perming mats are made are not of medical grade, and can cause allergic skin reactions in the sensitive scalp region.

Accordingly, it is a principal object of the invention to provide an improved perming mat having a substantially increased life expectancy.

It is another object to provide an improved perming mat, the wire stiffeners of which are less susceptible to the corrosive influence of hair care solutions and, consequently, more durable under repeated molding and flattening.

A further object is to provide such a mat wherein the absorbent layers are of medical grade material.

Another object is to provide such a mat with visible color indicia of its intended use.

Still another object of the invention is to provide such an improved perming mat that is inexpensive to manufacture.

These and other objects and advantages of the present invention will be more clearly understood from a consideration of the accompanying drawings and description of the preferred and modified embodiments.

DETAILED DESCRIPTION OF THE PREFERRED EMBODIMENT

Figure 1:
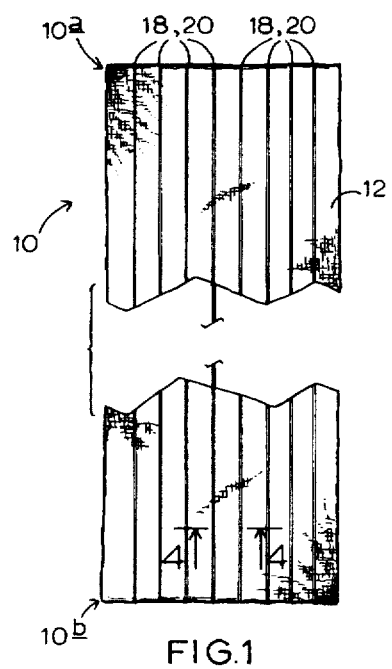
FIG. 1 is a fragmentary front elevation of the improved perming mat of the invention made in accordance with its preferred embodiment.
Figure 2:
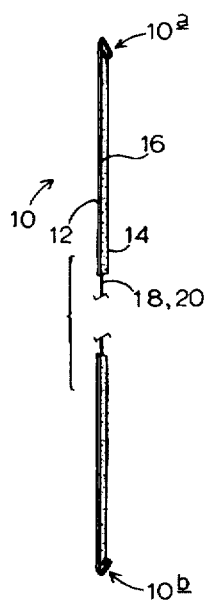
FIG. 2 is a fragmentary side elevation corresponding to FIG. 1.

Referring collectively to FIGS. 1 through 4, an infinitely shape-configurable memory, or perming, mat for use with hair care solutions, constructed in accordance with the preferred embodiment of the invention, is indicated generally at 10. Like prior art perming mats, mat 10 includes means defining opposed, first and second, substantially coextensive, flexible, absorbent material expanses 12, 14 of a desired length permanently adhered to one another by adhesive means 16 (refer to FIGS. 2 through 4). Thus, expanses 12, 14 may be thought of as means defining opposed expanses of mat 10. Like prior art perming mats, mat 10 includes a shape-retentive armature, or armature means, or plural malleable copper wire stiffeners, or filaments, 18 for retaining a desire shape of the mat when it is molded by a user. As in prior art perming mats: wire stiffeners 18 lie in the plane of, and interpose, adhered, layered expanses 12, 14; are laterally spaced; are aligned substantially parallel with one another; and extend longitudinally of elongate mat 10. Like prior art perming mats, extreme ends 10a, 10b of mat 10 are folded and crimped as shown in FIG. 2, to finish the transversely extending edges of the mat.

Unlike prior art perming mats, and providing a significant improvement thereover, mat 10 and its preferred embodiment comprises small gauge, e.g. preferably between approximately 0.0122- and 0.0130-inch diameter (nominally 0.0126-inch diameter or 28-AWG), wire stiffeners 18 each having associated therewith a substantially hair-care-solution-inert covering 20 approximately 1-mil thick for substantially preventing corrosion of the wire stiffeners when in contact with hair care solutions. In the preferred embodiment, covering 20 of the copper wires used in mat 10 is a polymer or copolymer, e.g. polyurethane or polyurethane-nylon, applied by any suitable, known process. In another embodiment, covering 20 is silver (Ag) or tin (Sn), plated by any suitable, known process. These coverings have been discovered not only to be substantially inert to the corrosive and/or the copper-reactively poisonous agents, e.g. thioglycolic acid, typically found in perming and neutralizing hair care solutions, but also to provide a more durable mat. This result is surprising, because the small gauge wires that make up wire stiffeners 18, prior to covering with the inert material, are of smaller diameter than that used in prior art apparatus, which typically is approximately 0.014-inch. It is believed that perming mats made in accordance with the embodiments described herein have a substantially extended life in excess of fifty cycles (i.e. cyclically repeated molding and flattening).

Unlike those in prior art perming mats, layers 12, 14 of mat 10 are made of medical grade material. In the preferred embodiment, layer 12 is a paper or cloth fiber (made by a slurry process similar to the well-known Fordeneer process) that, by its composition and/or treatment, is not only substantially inert to hair care solutions, but also hypoallergenic. In the preferred embodiments, layer 14 is a true polymer or resin foam that, by its composition and/or treatment, is both substantially inert to hair care solutions and hypoallergenic. In the preferred embodiment, heat actuable adhesive means 16, e.g. a polyamide layer such as "Stitch Witchery" made by U.S.M. Corporation, is used because it provides excellent bonding, is substantially inert to hair care solutions, and is hypoallergenic. Finally, in the preferred embodiment, covering 20 of armature 28 is inert to hair care solutions and hypoallergenic. Thus, the entire structure of mat 10, including first and second expanses 12, 14, adhesive means 16 and armature 18, is substantially non-reactive in the presence of hair care solutions. As a result of this important advance, hair care solutions do not adversely react with the material makeup of the perming mat, and the perming mat does not irritate the scalp.

Referring specifically to FIG. 1, it may be seen that wire stiffeners, or filaments, 18 are visibly disposed between first and second expanses 12, 14 by controlling the opacity and/or thickness and/or fill factor of fiber layer 12. In accordance with a proposed modification to the preferred embodiment of the invention, inert covering 20 of wire stiffeners 18 is colored, e.g. by tinting the polymer. Visible coloration of the wire stiffeners' coverings 20 provides user-readable coding means intermediate expanses 12, 14 and visible through expanse 12 (in front view), or expanse 14 (in rear view), or both. The coding means provides the user of mat 10 with color coded use indicia, or information regarding its intended use. For example, differently sized mats might be color coded to facilitate size differentiation. Or mats having different shape-retentiveness might be color coded to so indicate. Mats 10 made in accordance with the proposed modification can be coded to indicate their intended use without adversely affecting their important inert or hypoallergenic qualities, as might coloration of the medical grade materials from which expanses 12, 14 are made.

In use, mat 10 can be molded by its user into an infinite number of shapes, with the mat retaining its user-molded shape until changed by the user. This is made possible by the positioning of covered wire stiffeners intermediate adhered, opposing, hair-care-solution-inert layered expanses. The small gauge wire used in the wire stiffeners, in combination with a hair-care-solution-inert covering, provides unprecedented life expectancy in the perming mats, by inhibiting reaction between the corrosive agents within the hair care solutions and the metal from which the wire stiffeners are formed. The wire stiffeners, which, by virtue of the present invention, do not corrode and thus weaken over extended use, are capable of conforming the adhered, layered expanses to a first, desired user-molded shape and to a second, desired, user-flattened shape through a substantially increased number of cycles. In addition to providing substantially prolonged life, the mat also reduces the possibility of an adverse reaction thereto by a person whose hair is begin treated. Because there is no corrosion of the wire stiffeners, there is no discoloration of the mat, thereby reducing the required frequency of its laundering. Yet the mat is of very simple and inexpensive construction, relying as it does upon conventional fabrication techniques.

Figure 3:
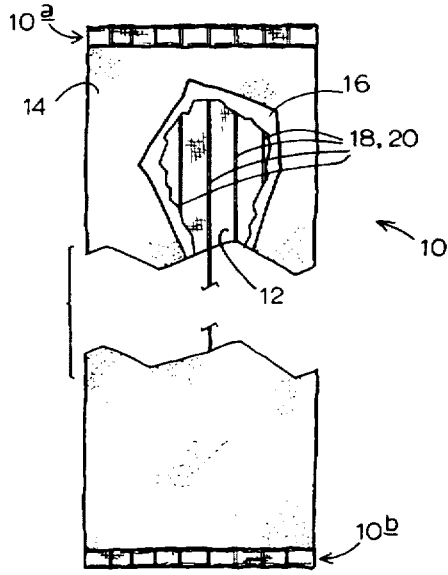
FIG. 3 is a fragmentary rear elevation corresponding to FIGS. 1 and 2, showing in cutaway view the array of wire stiffeners within the mat.
Figure 4:
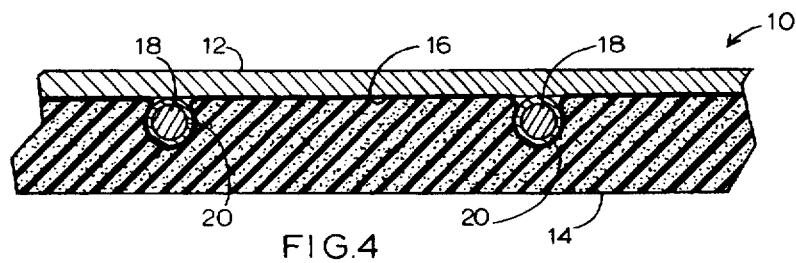
FIG. 4 is an enlarged, cross-sectional view of the improved perming mat in its preferred embodiment, taken generally along the lines 4—4 of FIG. 1.

Those of skill in the art will appreciate that the adhered, absorbent layers may be made of any suitable material and by any suitable process, e.g. the fabric may be manufactured in a weaving rather than slurry process. It will be appreciated that one or both of the opposed, adhered layers may be made of inert and/or hypoallergenic materials, as the requirements dictate. It will be appreciated that adhesive means may be applied on either side of the wire stiffeners, although it is believed to be preferable that the "stitch Witchery" adhesive layer lie adjacent foam layer 14, as illustrated in FIGS. 3 and 4. The skilled will appreciate that the armature may comprise any malleable structure that is capable of retaining a user-molded shape and of resisting the undesirable corrosive influence of agents present in hair care solutions, and that the armature may be woven into or otherwise integrally formed with one or the other of the opposed absorbent layers. Finally, the skilled in the art will appreciate that means for color coding the improved perming mat may take a variety of forms, e.g. an inert and/or hypoallergenic visibly colored adhesive may be used to adhere the opposed, absorbent layers.

Accordingly, while a preferred embodiment of the invention and modifications thereto have been described herein, it is appreciated that further modifications are possible that come within the scope of the invention.

It is claimed and desired to secure by Letters Patent:

1. In a perming mat for use with hair care solutions, the mat being flexible and absorbent and including malleable wire stiffeners for user-molded shape retention of the mat, the improvement comprising a substantially hair-care-solution-inert covering associated with each wire stiffener for substantially preventing corrosion of the wire stiffeners when in contact with hair care solutions, said covering being approximately 1 mil thick.

2. The mat of claim 1, further comprising first and second substantially coextensive expanses of absorbent material, said malleable wire stiffeners being interposed between said first and second expanses and including user-readable coating means visible through at least one of said expanses, said entire structure, including said first and second expanses, being non-reactive in the presence of hair care solutions.

3. The mat of claim 1, further including a first flexible expanse of hypoallergenic material, a second flexible expanse of material substantially coextensive with said first expanse, and adhesive means permanently adhering said first and said second expanses in layered relationship with one another, said malleable wire stiffeners being interposed between said first and said second expanses and being capable of retaining a user-molded shape of such adhered layered expanses.

4. The mat of claim 3 wherein said second expanse if of hypoallergenic material.

5. The mat of claim 1 wherein said covering associated with each wire stiffener is a polymer.

6. The mat of claim 1 wherein said covering associated with each wire stiffener is silver plating.

7. The mat of claim 1 wherein said covering associated with each wire stiffener is tin plating.

8. The mat of claim 1 wherein said covering associated with each wire stiffener is hypoallergenic.

9. The mat of claim 1 wherein said wire stiffeners are copper.

10. The mat of claim 1 wherein said wire stiffeners extend in substantially parallel relationship with one another and are capable of conforming said mat to a first desired user-molded shape and to a second desired user-flattened shape through substantially repeated cycles, said wire stiffeners being between approximately 12.2 mils and 13.0 mils in diameter.

11. The mat of claim 1 wherein said covering associated with each wire stiffener comprises polyurethane.

12. The mat of claim 1 wherein said covering associated with each wire stiffener comprises polyurethane and nylon.

* * * * *